(12) United States Patent
Iseki et al.

(10) Patent No.: US 6,936,123 B2
(45) Date of Patent: Aug. 30, 2005

(54) APPARATUS FOR PRODUCING LAMINATED ELECTRONIC PART AND METHOD OF PRODUCING THE PART

(75) Inventors: Yutaka Iseki, Takefu (JP); Akifumi Fujita, Okayama (JP); Atsushi Yoshimura, Fukui (JP); Takehiko Miura, Takefu (JP)

(73) Assignee: Murata Manufacturing Co., Ltd. (JP)

( * ) Notice: Subject to any disclaimer, the term of this patent is extended or adjusted under 35 U.S.C. 154(b) by 21 days.

(21) Appl. No.: 10/403,870

(22) Filed: Mar. 28, 2003

(65) Prior Publication Data
US 2003/0183330 A1 Oct. 2, 2003

(30) Foreign Application Priority Data

Mar. 29, 2002 (JP) ........................................ 2002-096777
Feb. 20, 2003 (JP) ........................................ 2003-043279

(51) Int. Cl.[7] .......................... B32B 31/12; B32B 35/00; H01G 4/30
(52) U.S. Cl. ....................... 156/89.16; 156/64; 156/360; 156/378
(58) Field of Search ................................. 156/64, 89.12, 156/89.16, 264, 351, 360, 361, 362, 378; 29/25.42; 264/615

(56) References Cited

U.S. PATENT DOCUMENTS

| | | | | |
|---|---|---|---|---|
| 4,851,914 A | * | 7/1989 | Pfanhouser et al. | 348/217.1 |
| 5,827,382 A | * | 10/1998 | Ogawa et al. | 156/64 |
| 5,942,063 A | * | 8/1999 | Mori | 156/89.16 |
| 2002/0029837 A1 | * | 3/2002 | Arishiro et al. | 156/89.12 |

FOREIGN PATENT DOCUMENTS

| | | |
|---|---|---|
| JP | 6139341 | 5/1994 |
| JP | 922830 | 1/1997 |
| JP | 933342 | 2/1997 |
| JP | 2917142 | 4/1999 |
| JP | 3060849 | 4/2000 |
| JP | 3063577 | 5/2000 |

* cited by examiner

*Primary Examiner*—Melvin C. Mayes
(74) *Attorney, Agent, or Firm*—Ostrolenk, Faber, Gerb & Soffen, LLP

(57) ABSTRACT

To produce a capacitor with a target static capacitance, an apparatus for producing a laminated ceramic capacitor is adapted to measure the thickness of a green sheet and the area of an internal electrode by an in-line system and with high accuracy, and to laminate a calculated number of the green sheets based on the measured values. The apparatus includes a sheet-supplying unit, a sheet-thickness measuring unit, a laminating unit, and a discharging unit.

13 Claims, 8 Drawing Sheets

APPARATUS FOR PRODUCING LAMINATED ELECTRONIC PART AND METHOD OF PRODUCING THE PART

BACKGROUND OF THE INVENTION

1. Field of the Invention

The present invention relates to a laminated electronic part and a method of producing the same.

Generally, production of laminated electronic parts such as laminated ceramic capacitors and so forth, includes sequentially printing plural internal electrodes on the surface of a mother ceramic green sheet, laminating a plurality of the mother ceramic green sheets, pressing the green sheets in close contact with each other to form a mother ceramic lamination-block, cutting the mother ceramic lamination block in conformation with the arrangement of the internal electrodes to produce respective laminated ceramic chips, firing the cut laminated ceramic chips, and forming external electrodes on the fired laminated ceramic chips.

For example, Japanese Unexamined Patent Application Publication No. 9-22830 describes a high yield method for producing capacitors of which the deviation of the static capacitance is small. According to this production method, an internal electrode is formed on the surface of a ceramic green sheet, and thereafter, the area is measured by an in-line system. The number of ceramic green sheets to be laminated is calculated so that a desired electrostatic capacitance can be obtained.

According to the above-mentioned method, the area of an internal electrode is measured, and the number of ceramic green sheets to be laminated is calculated based on the area data. However, the calculation is carried out assuming that the ceramic green sheets have a constant thickness. That is, it does not consider that the electro-static capacitance may change due to variations in the thickness of the ceramic green sheets.

A CCD camera or the like is used in measurement of the area of an internal electrode. Regarding conventional CCD cameras, the pixel shapes are rectangular, respectively, and the pixels are arranged in a rectangular grating pattern. Accordingly, problems are caused in that the resolutions in the longitudinal and transverse directions of the respective CCD cameras are different from each other, and the measurement precision is low.

SUMMARY OF THE INVENTION

The present invention provides an improved apparatus for producing a laminated electronic part with which an internal electrode having a small deviation can be produced at a high yield, and a method of producing the laminated electronic part.

According to an embodiment of the present invention, there is provided an apparatus for producing a laminated electronic part which comprises a sheet-thickness measuring unit for measuring the thickness of a ceramic green sheet; an internal electrode image pickup unit for picking up the image of an internal electrode formed on the surface of the ceramic green sheet; a processing unit for calculating the number of sheets to be laminated based on the area data which is prepared from the thickness data from the sheet-thickness measuring unit and the image data picked-up by the internal electrode image-pickup unit; and a laminating unit for laminating the ceramic green sheet; the respective units being arranged in a production line.

In the above-description, the expression, "the respective units being arranged in a production line" means that the respective units provided in the apparatus for producing a laminated electronic part are arranged in a continuous line comprising interconnected units, and a result obtained in at least one unit is continuously or automatically fed back or forward to another unit. On the other hand, the expression "the respective units being arranged off-line" means that at least one of the units (e.g., the sheet-thickness measuring unit) is applied, e.g., for measuring a sampled ceramic green sheet having an internal electrode formed thereon, and to feed back or forward an obtained result, the line is stopped for a while, that is, the respective units are arranged in a discontinuous or non-automatic line.

According to the present invention, there is provided a method of producing a laminated electronic part which comprises the steps of: measuring the thickness of a ceramic green sheet; picking up an image of an internal electrode formed on the surface of the ceramic green sheet; calculating the number of sheets to be laminated by a process based on the area data which is prepared on the basis of the thickness of the ceramic green sheet and the picked-up image of the internal electrode; and laminating the ceramic green sheet so that the calculated lamination sheet number is satisfied; the respective processes being carried out in a production line.

In the above-description, the expression, "the respective processes being carried out in a production line" means that the respective steps included in the method of producing a laminated electronic part are carried out in a continuous line comprising interconnected units, and a result obtained in at least one step is continuously or automatically fed back or forward to another step. On the other hand, the expression "the respective steps being carried out off-line" means that at least one step (e.g., the step of measuring the sheet-thickness) is applied, e.g., for measuring a sampled ceramic green sheet having an internal electrode formed thereon, and to feed back or forward an obtained result, the line is stopped for a while, that is, the respective steps are carried out discontinuously or non-automatically.

The sheet-thickness measuring unit may measure the thickness of every ceramic green sheet, or may measure the thickness of one or several sheets selected from all the ceramic green sheets.

Moreover, the internal electrode forming unit or step for forming an internal electrode on the surface of a ceramic green sheet may be provided in the production line. A ceramic green sheet wound in a roll may be employed, or a card-shaped printed ceramic green sheet may be used.

In the above-described constitution, measurement of the sheet-thickness of a ceramic green sheet and that of the area of an internal electrode are carried out in a line. The measurement values of the ceramic green sheet thickness and the internal electrode area are sequentially fed forward to calculate the number of ceramic green sheets to be laminated, and the lamination is carried out. Thereby, capacitors with less dispersion in static capacitance can be produced at a high yield.

Preferably, the image of the internal electrode is picked up with a CCD camera whose pixels have a square shape, respectively, and are arranged in a square grating pattern. Thus, the resolutions in the longitudinal and transverse directions of the CCD camera become equal, and the measuring accuracy is enhanced.

Preferably, the sizes in the longitudinal and transverse directions per pixel of the CCD camera of an object are size-calibrated by use of a substantially columnar member (e.g., a metallic pin gauge). Thus, high precision size calibration is enabled. Especially, in the case of the pixels of the CCD camera having a square shape, the resolutions in the longitudinal and transverse directions of the CCD camera become equal to each other. The size calibration can be easily performed.

Also, preferably, the ceramic green sheet is laminated so that the overlap degree between internal electrodes opposed in the lamination direction is constant for all the layers. Thus, the dispersion of the stray capacitance is decreased, compared to that of a laminate in which only the uppermost layer is shifted. Thus, the accuracy of the static capacitance can be enhanced.

Other features and advantages of the present invention will become apparent from the following description of embodiments of the invention which refers to the accompanying drawings.

DESCRIPTION OF EMBODIMENTS OF THE INVENTION

Hereinafter, embodiments of a method of producing a laminated electronic part and an apparatus for producing the same according to the present invention will be described with reference to the accompanying drawings. A laminated ceramic capacitor will be described as an example of the laminated electronic part. The laminated electronic part may be a laminated electronic part containing a capacitor such as a laminated LC filter, a laminated LC noise filter, a laminated high-frequency module, and the like, or a laminated electronic part such as a laminated thermistor, a laminated varistor, and the like.

Figure 1:
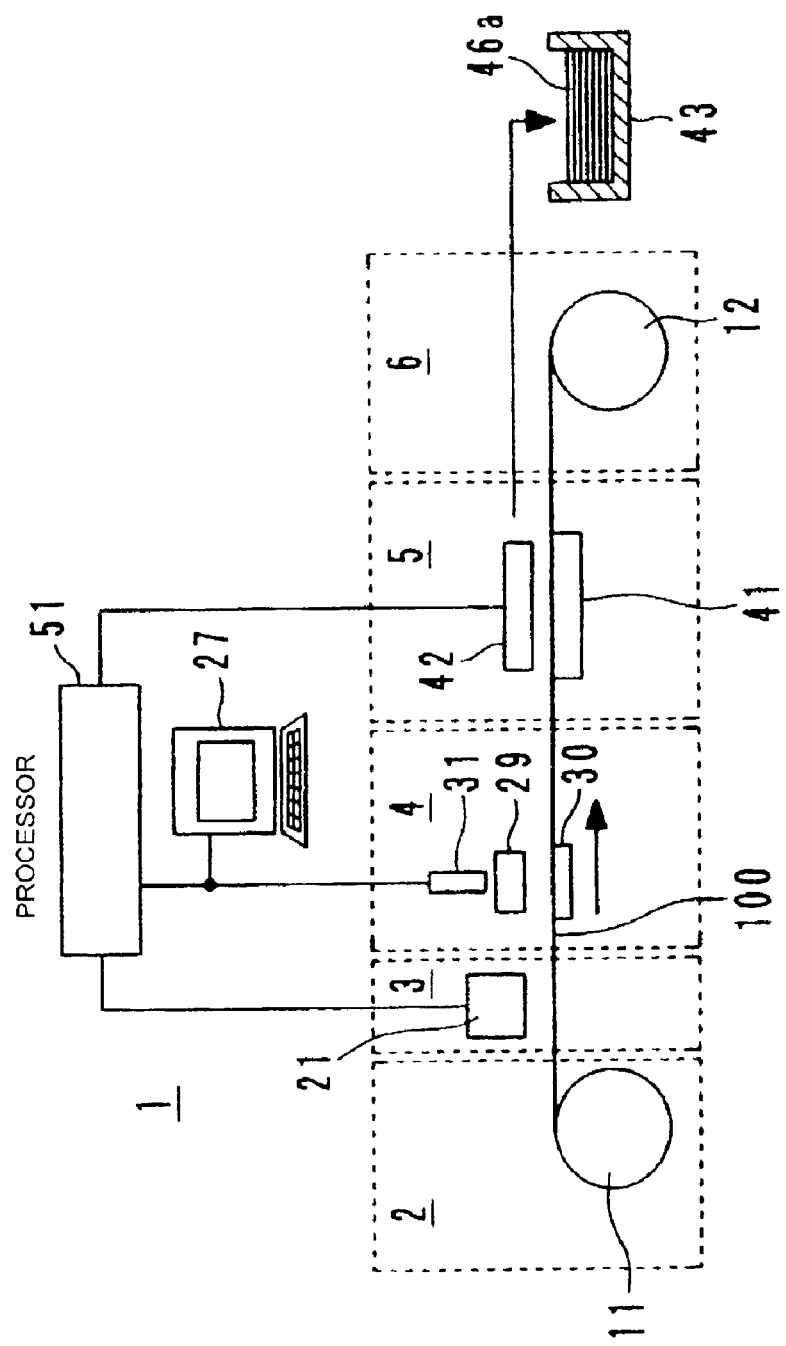
FIG. 1 is a schematic view of the configuration of an apparatus for producing a laminated electronic part according to an embodiment of the present invention.

FIG. 1 schematically shows the configuration of an apparatus 1 for producing a laminated ceramic capacitor. The production apparatus 1 is used to produce a capacitor having a target electrostatic capacitance. The thickness of a ceramic green sheet and the area of an internal electrode formed on the ceramic green sheet are measured at a high precision. The ceramic green sheet is laminated based on the measurement values. The production apparatus 1 comprises a sheet-supplying unit 2, a sheet-thickness measuring unit 3, an internal electrode image pick-up unit 4, a laminating unit 5, and a discharging unit 6. The positions where the sheet-thickness measuring unit 3 and the internal electrode image pick-up unit 4 are disposed may be reversed.

First, preliminary trial production is carried out at an overlap degree SS of opposed internal electrodes, a lamination sheet number (n−1)', and a ceramic green sheet thickness t', based on the structure design of a laminated ceramic capacitor. Thus, the relative dielectric constant $\epsilon$ of the ceramic green sheet is determined according to the following equation (1).

$$\epsilon = C' \times t' / \{\epsilon_0 \times (n-1)' \times SS\} \quad (1)$$

in which $\epsilon_0$ is a dielectric constant in vacuum, and C' is an electrostatic capacitance obtained by the trial production.

A long ceramic green sheet 46 formed on a carrier film is screen-printed by a roll-to-roll system. Thus, a plurality of internal electrodes 47 (see FIG. 4, which shows only one internal electrode 47) are formed at a constant pitch (printing pitch). The sheet is taken up into a roll-form. Thus, a printed ceramic green sheet 100 is prepared.

The printed ceramic green sheet 100 is set onto a feeding roller 11 of the sheet-supplying unit 2. The printed ceramic green sheet 100, which is intermittently fed at the printing pitch from the feeding roller 11, is supplied into the sheet-thickness measuring unit 3. The thickness of the ceramic green sheet 46 is sequentially measured every time when the sheet is intermittently fed, by means of a non-contact type film-thickness measuring head 21 operated by a radiation or laser system or the equivalent. Preferably, the positions where the ceramic green sheet is measured are set nearly in the middle portion in the width direction thereof and in the non-printed portions between the printed internal electrodes 47 in the longitudinal direction of the ceramic green sheet 46. The thickness may also be measured by a film-thickness measuring device such as a contact type film-thickness meter, e.g., a micrometer or the like. The measurement values of the green sheet thickness are stored in a memory of a processor 51.

Next, the printed ceramic green sheet 100 of which the thickness has been measured is conveyed to the internal electrode image pick-up unit 4. The conveyed printed ceramic green sheet 100 is fixed to a measuring table 30 by use of vacuum suction, static electricity, or the like. The internal electrodes 47 are imaged sequentially every time when the sheet is intermittently fed. The area values are calculated by means of the processor 51 according to a method which will be described below, and are stored as internal electrode area measurement values in a memory of the processor 51.

For measurement of the internal electrodes 47, the following different methods are useful. According to a first method, each internal electrode on the whole ceramic green sheet 100 which constitutes a laminated ceramic capacitor is imaged at two or more positions thereof. The central value (median) is calculated from the measurement values of a plurality of internal electrodes 47 measured at two or more positions thereof, respectively, and is taken as an area central value.

According to a second method, each internal electrode on the whole ceramic green sheet 100 which constitutes a laminated ceramic capacitor is imaged at four or more positions thereof. The maximum and the minimum are excluded from the measurement values of a plurality of the internal electrodes 47 measured at four or more positions thereof, respectively, and then, the average is calculated and taken as an area central value.

According to a third method, the central value or average of each internal electrode is calculated according to the first or second method, and thereafter, the central value or average is found of all the internal electrodes of the ceramic green sheet, and is taken as an area central value.

Figure 4:
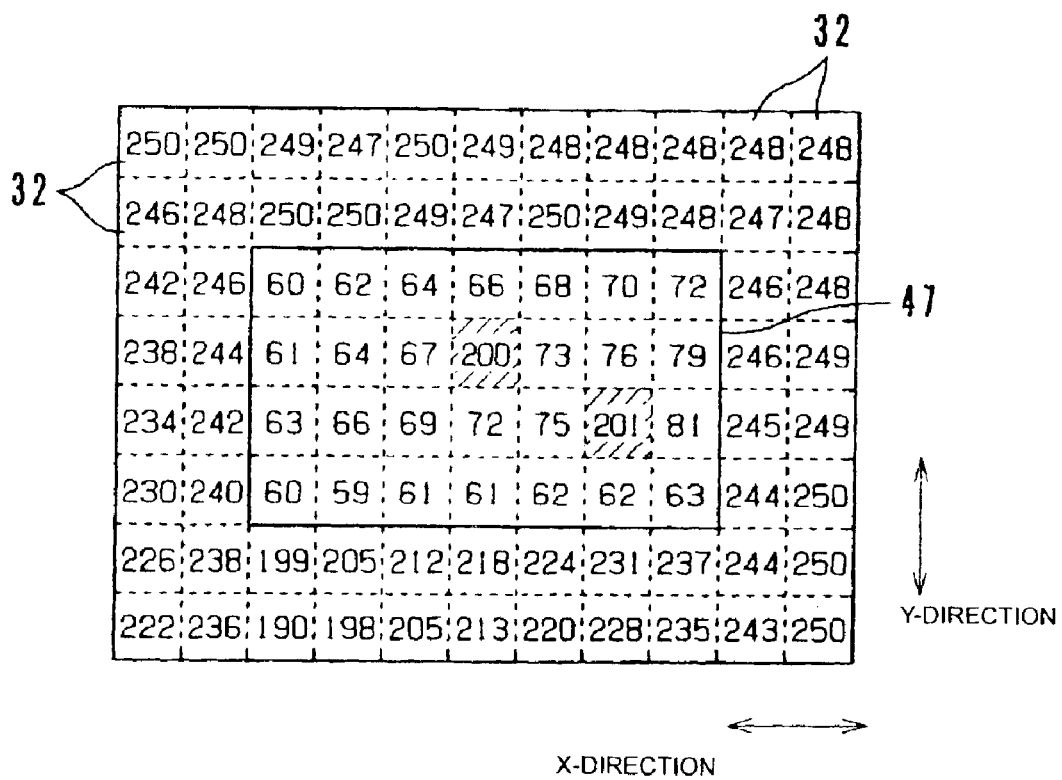
FIG. 4 illustrates the arrangement and the shapes of the pixels in a CCD camera.

For example, a CCD camera 31, e.g., operated by a non-interlaced (sequential line scanning) overall-pixel output system (the number of pixels is 1,000,000 or more), is employed. In this case, the imaging timing difference on the pixel unit level becomes minimal in an adjacent pixel region. Thus, the area of an internal electrode can be measured with less error. More preferably, a CCD camera provided with a high-magnification telecentric lens (low distortion lens) having a numerical aperture (NA) of at least 0.05 attached thereto is employed. This is carried out in order to prevent the resolution from decreasing and an image from being distorted, which may be caused by the high magnification. As shown in FIG. 4, in the CCD camera 31, pixels 32 having a square shape, respectively, are arranged in a square grating pattern. Thus, the resolutions in the longitudinal and transverse directions of the CCD camera 31 become equal to each other. This enhances the measurement precision.

For imaging, light from a luminaire 29 is irradiated onto an internal electrode 47 to be imaged. Preferably, the luminaire 29 has a ring-shape, and has an illuminance of at least 10,000 lux, using ring-fiber illumination, LED illumination, halogen illumination, xenon illumination, fluorescent-lamp illumination, or the equivalent. Moreover, preferably, the luminaire 29 has an illuminance feed-back function in order to stabilize the illuminance.

The image of each internal electrode 47 is magnified by means of the high magnification telecentric lens, and is picked up with the CCD camera 31. The obtained image of the internal electrode 47 is displayed on a monitor 27, which will be described below in detail, and also, is 256-gradation grey processed by the processor 51. Moreover, the processor 51 binarizes the grey-processed image data of the internal electrode 47 with respect to a predetermined threshold. Then, the number of the pixels 32 having a value less than the threshold is counted up to obtain the number of pixels corresponding to the internal electrode 47. Next, the area value per pixel of the object, which has been obtained in advance by size-calibration, further discussed below, is multiplied by the number of pixels. Thus, the area of the internal electrode 47 is calculated.

Under control of the processor 51, the pick-up position of a sheet thickness and an internal electrode correspond to the position of the printed ceramic green sheet 100 which is being intermittently fed, based on the distance between the measuring position of the sheet thickness and the image-pickup position of the internal electrode, the conveying pitch (printing pitch), and the number of conveying cycle. The above-mentioned number of measurement cycles may be calculated based on the measurement time lag.

When both of the sheet thickness and the area of the internal electrode are measured in the same portion of a sheet, the lamination sheet number (n−1), at which a desired electrostatic capacitance can be obtained, is determined according to a method which will be described below.

The printed ceramic green sheet 100 is conveyed to the laminating unit 5. In the unit 5, the long printed ceramic green sheet 100 on a carrier film is cut at printing pitch intervals at which the sheet 100 is fed from the sheet-supplying unit 2 by means of punching heads 41 and 42, so that rectangular work sheets 46a are formed, and simultaneously, are released from the carrier film. The punched rectangular work sheets 46a (with plural internal electrodes 47a formed on the surface thereof) are overlapped in a press mold 43. For lamination, the above-described procedure is repeated at the repeat number equal to the lamination sheet-number (n−1) which is calculated and obtained by rounding the digits after the decimal point to the nearest integer.

For determination of the lamination sheet number (n−1) which is used to obtain a desired electrostatic capacitance, different methods may be employed. Two typical methods will be described below.

EXAMPLE 1

The lamination sheet number (n−1) is calculated according to the following equation (2), based on the cumulative average t of the thicknesses of a ceramic green sheet 46 which are input to the processor 51 every time when the sheet is conveyed at printing pitch intervals (the average of the sheet thicknesses measured for each printing pitch), and the cumulative average S of the areas of internal electrodes 47 (the average of the areas of the internal electrodes measured for each printing pitch).

$$(n-1) = (C \times t)/\{\epsilon_0 \times \epsilon \times SS \times (1 + A \times (S-S')/S')\} \quad (2),$$

in which (n−1) represents the lamination sheet-number which is used to obtain a desired electrostatic capacitance, C is a desired electrostatic capacitance, $\epsilon_0$ is the dielectric constant in vacuum, $\epsilon$ is a relative dielectric constant calculated according to the aforementioned equation (1) in the preceding trial production, SS is an overlap degree between opposed internal electrodes generated according to the design in the preceding trial production, A is an area coefficient (the coefficient is set at 0 to 1 depending on the kinds of raw materials, and is optionally set based on empirical values in the preceding trial production), and S' is the area of an internal electrode determined in the preceding trial production.

It should be noted that the values excepting t and S are input into the processor 51 in advance.

Green ceramic sheets are laminated of which the number is obtained by rounding off the digits after the decimal point of the calculated laminated-sheet number (n−1) in the preceding trial production, at an overlap degree SS between opposed internal electrodes employed according to the design in the preceding trial production. At final lamination, the punching position of the punching heads 41 and 42 is shifted, or alternatively, the punching is carried out at the same position as that in the preceding punching, and then, the lamination position is shifted, depending on the digits after the decimal point of the laminated-sheet number (n−1) so that the respective positions of the internal electrodes are adjusted (so-called "shifted lamination"). Thus, a laminate corresponding to the laminated-sheet number (n−1) which obtains a desired electrostatic capacitance C is produced.

The method is effective in the following case. The lamination sheet number (n−1) which is used to obtain a desired capacitance C cannot be determined before the portion of a ceramic green sheet in which both of the sheet thickness and the internal electrode area are measured is conveyed to reach the succeeding punching and lamination unit 5.

The values of the sheet thickness of the ceramic green sheet and the values of the internal electrode area, which are measured in the range from a first lamination position of the sheet to the final lamination position of the sheet, are grouped. When the grouping is completed, the cumulative average t and the cumulative average S are reset, and newly cumulative averaging is started. Thereafter, the lamination is repeated. The grouping means one unit, which has the laminate or a laminated block.

EXAMPLE 2

The method of Example 2 is effective in the following case: the number of portions of a ceramic green sheet of which both the sheet thickness and the internal electrode area are measured is the lamination sheet number (n−1) which is calculated to obtain a desired electrostatic capacitance and obtained by rounding up the digits after the decimal point; and the lamination sheet number (n−1) can be calculated before the latest portion of the ceramic green sheet is conveyed to reach the next punching and laminating unit 5 (that is, in the case of a pooling portion provided). The pooling portion has enough area not to be able to laminate first ceramic green sheet until last ceramic green sheet is calculated after the first ceramic green sheet is calculated.

The overlap degrees SS' between opposed internal electrodes for all the layers are calculated back so as to be equal to each other (the overlap degrees SS' are calculated back so that the lamination number of sheets (n−1) is a natural number). All the layers (the number is equal to the lamination number (n−1) of which the digits after the decimal point are rounded on) are laminated by the above-described shift-lamination system so that the overlap degrees SS' between opposed internal electrodes are achieved. For the laminate formed by this method, the overlap degrees between opposed internal electrodes are equal to each other, and the dispersion of a stray capacitance is decreased compared to a laminate formed by the shifted lamination of only the uppermost layer. Thus, advantageously, the accuracy of the static capacitance is enhanced.

As described above, the thickness t of the ceramic green sheet 46 and the area S of the internal electrode 47 are sequentially measured in-line. Data based on the obtained measurement values are fed forward to a static capacitance designing, and the shift-lamination is carried out. Thus, a laminated ceramic capacitor having a desired static capacitance C can be provided at high accuracy.

The overlapped rectangular work sheets 46a are pressed into close contact with each other by means of a pressing machine (not shown). Thus, an unfired ceramic laminate block is formed. The long ceramic green sheet 46, after the work sheets 46a are cut, is conveyed into the discharging unit 6 to be wound around a take-up roll 12.

Figure 2:
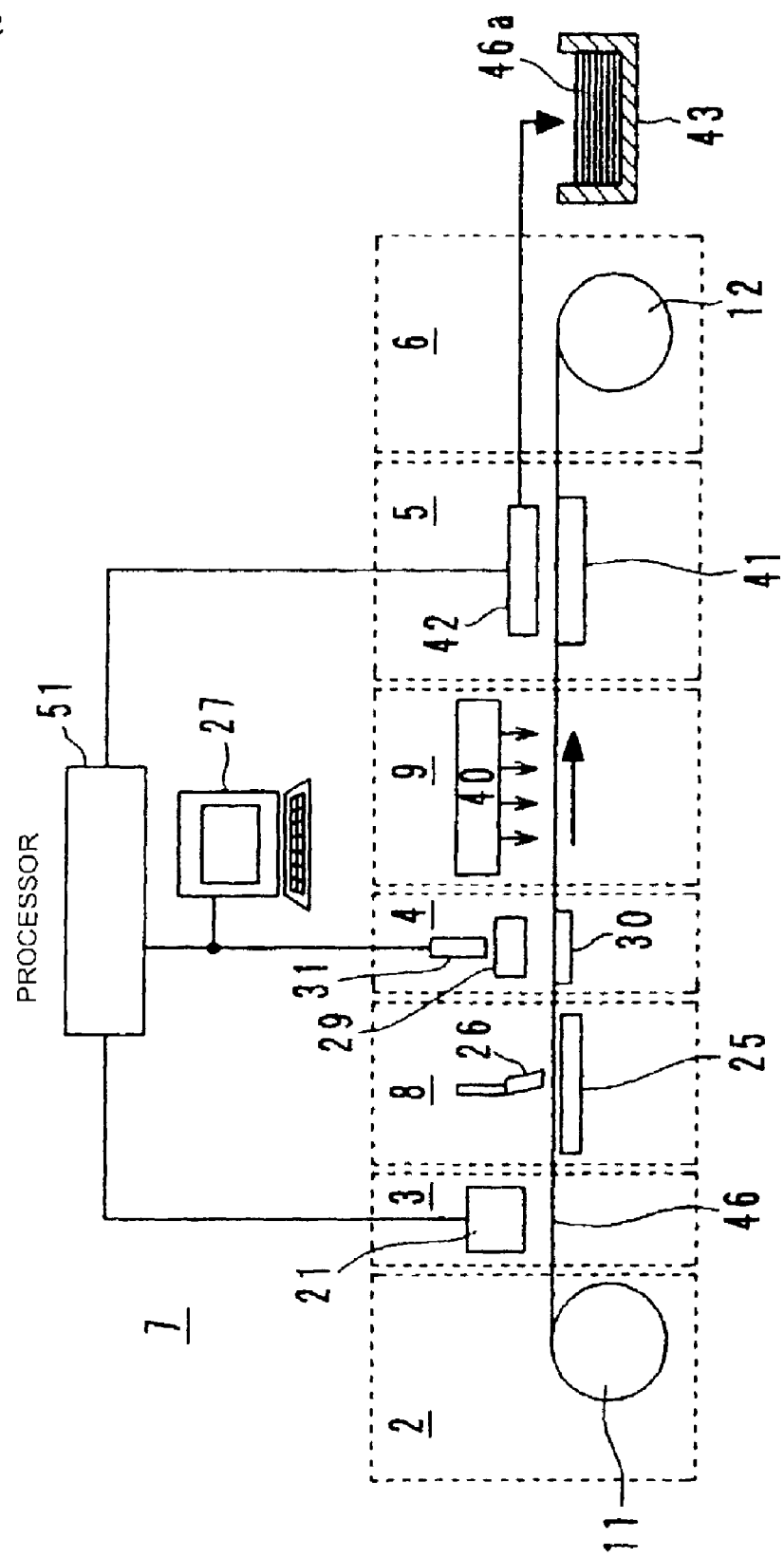
FIG. 2 is a schematic view of the configuration of an apparatus for producing a laminated electronic part according to another embodiment of the present invention.

FIG. 2 schematically shows the configuration of an apparatus 7 for producing a laminated ceramic capacitor. The production apparatus 7 comprises the sheet-thickness measuring unit 3, an internal electrode forming unit 8, the internal electrode image pick-up unit 4, a drying unit 9, the laminating unit 5, and the discharging unit 6. That is, the production apparatus 7 is the same as a production apparatus which includes the production apparatus 1 and the internal electrode forming unit 8 and the drying unit 9 are further added in the line of the production apparatus 1.

According to the above-described constitution, the printing and lamination processes can be made continuous. Accordingly, the production environment can be made clean. As a result, the possibility of impurities such as dust entering the production process is reduced. Moreover, feeding-back for setting up printing conditions for enhancement of the printing accuracy (uniform printing) is enabled. Furthermore, if a mis-printed portion is formed, additional printing can be performed by feeding-back. This is especially effective for forming a structure in which an unprinted ceramic green sheet is incorporated before the lamination is completed.

Hereinafter, a method of producing a laminated ceramic capacitor by use of the production apparatus 7 will be described.

In the sheet-supplying unit 2, the long ceramic green sheet 46 formed on a carrier film is wound on the feeding roller 11 to have a roll shape. The ceramic green sheet 46, intermittently fed from the feeding roller 11 at a constant punching pitch, is supplied into the sheet-thickness measuring unit 3. In the sheet-thickness measuring unit 3, the thickness of the ceramic green sheet 46 is sequentially measured with a non-contact type thickness metering head 21 operated according to a radiation or laser system at the constant pitch intervals at which the ceramic green sheet 46 is supplied from the sheet-supplying unit 2.

Subsequently, the ceramic green sheet 46 of which the thickness has been measured is conveyed to the internal electrode forming unit 8. In the unit 8, a printing screen (not shown) is made to cover the ceramic green sheet 46 on a printing table 25, and electroconductive paste is screen-printed by means of a squeegee 26. Thus, plural internal electrodes 47 (see FIG. 4) are formed on the surface of the ceramic green sheet 46 at constant pitch intervals at which the sheet is conveyed from the sheet-supplying unit 2. Thereafter, the ceramic green sheet 46 is fixed onto a measuring table 30 by use of vacuum-suction or static electricity in the internal electrode image pick-up unit 4. The internal electrodes 47 are imaged at constant pitch intervals at which the ceramic green sheet 46 is conveyed from the sheet-supplying unit 2 by means of a CCD camera 31.

Subsequently, the ceramic green sheet 46 is conveyed to the drying unit 9. In the drying unit 9, the internal electrodes 47 are dried by means of hot air, far infrared rays, or heat generated from a heat source 40 such as a fan heater, an infrared ray heater, a hot plate, or the like. The drying may be carried out from the lower side of the ceramic green sheet 46 or from both the upper and lower sides thereof, if necessary, not being restricted to the drying from the upper side. The ceramic green sheet 46 of which the internal electrodes 47 are dried is conveyed to the laminating unit 5. In the laminating unit 5, the long ceramic green sheet 46 formed on a carrier film is cut to form the rectangular work sheets 46a by means of the punching heads 41 and 42. Simultaneously, the ceramic green sheet 46 is released from the carrier film. The cut rectangular work sheets 46a (the plural internal electrodes 47 are formed on the surface) are overlapped in the press mold 43. This process is repeatedly carried out at the repeat number equal to the laminated-sheet number (n−1) calculated and rounded up after the decimal point in advance of the lamination process.

Figure 3:
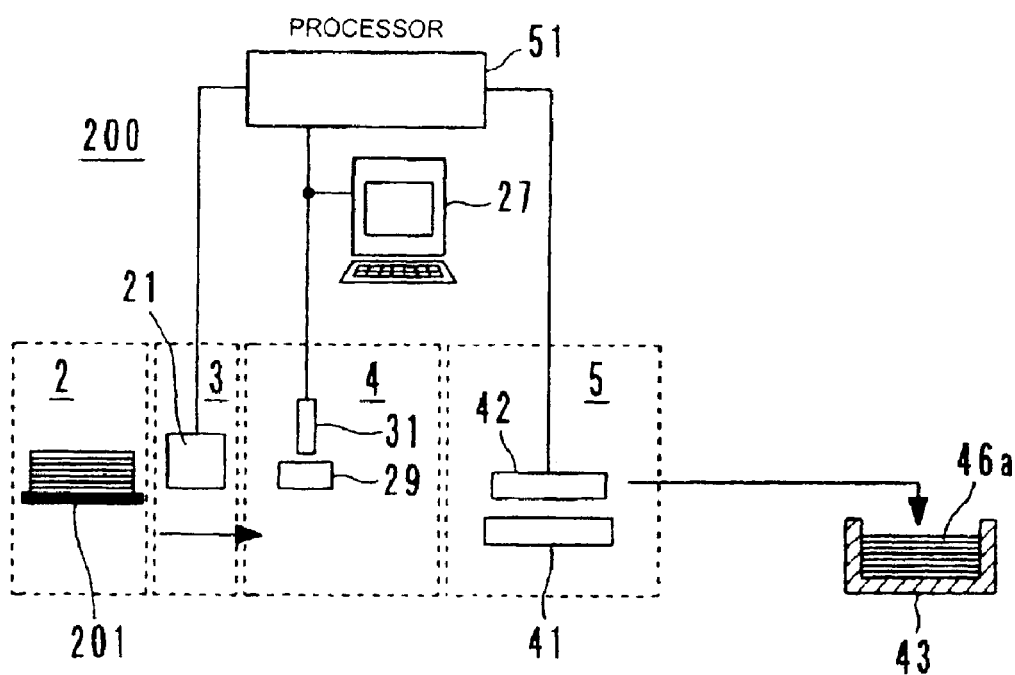
FIG. 3 is a schematic view of the configuration of an apparatus for producing a laminated electronic part according to still another embodiment of the present invention.

FIG. 3 schematically shows the configuration of a card-type apparatus 200 for producing a laminated ceramic capacitor. The apparatus 200 comprises the sheet-supplying unit 2, the sheet-thickness measuring unit 3, the internal electrode image pick-up unit 4, and the laminating unit 5.

Printed rectangular ceramic green sheet cards 201 are set in the sheet-supplying unit 2. Thereafter, the ceramic green sheet cards 201 are sequentially conveyed to the sheet-thickness measuring unit 3, to the internal electrode image pick-up unit 4 and to the laminating unit 5 in that order.

In the apparatus 200 for producing a laminated ceramic capacitor, overlapping the work sheets 46a does not depend on the printing sequence thereof in contrast to the apparatus 1 or 7 of roll-to-roll type. Ceramic green cards 201 optionally grouped based on the sheet thickness or the internal electrode area value can be laminated. Moreover, the apparatus 200 is effective in a case in which an unprinted ceramic green sheet is placed so as to be inserted between the overlapped work sheets 46a having internal electrodes formed thereon, a case in which another electrode pattern is printed while the work sheets 46a are overlapped, and so forth. In addition, the apparatus 200 is suitable when the rectangular work sheets 46a are laminated so that the overlap degrees between opposed internal electrodes for all the layers become equal.

An unfired ceramic laminate-block formed as described above is cut in conformation to the arrangement of the internal electrodes 47 to form individual laminated ceramic chips. The cut laminated ceramic chips are fired. An external electrode is formed on the laminated ceramic chip. Thus, a product (laminated ceramic capacitor) is obtained.

Hereinafter, an example of an image-processing method will be described in detail. First, a calibration reference electrode sheet which contains the ceramic green sheet 46 having the internal electrodes 47 formed on the surface by screen printing is prepared. The calibration reference electrode sheet is imaged with the CCD camera 31 while the sheet is illuminated by the luminaire 29. The obtained image is displayed on a monitor 27. The illuminance and the illumination angle (height) of the luminaire 29 are adjusted so that the internal electrode 47 displayed on the monitor 27 ceases to generate halation. That is, the image is so adjusted as to be illuminated to a constant degree while the illumination-reflection from the internal electrode 47 is suppressed.

Figure 5:
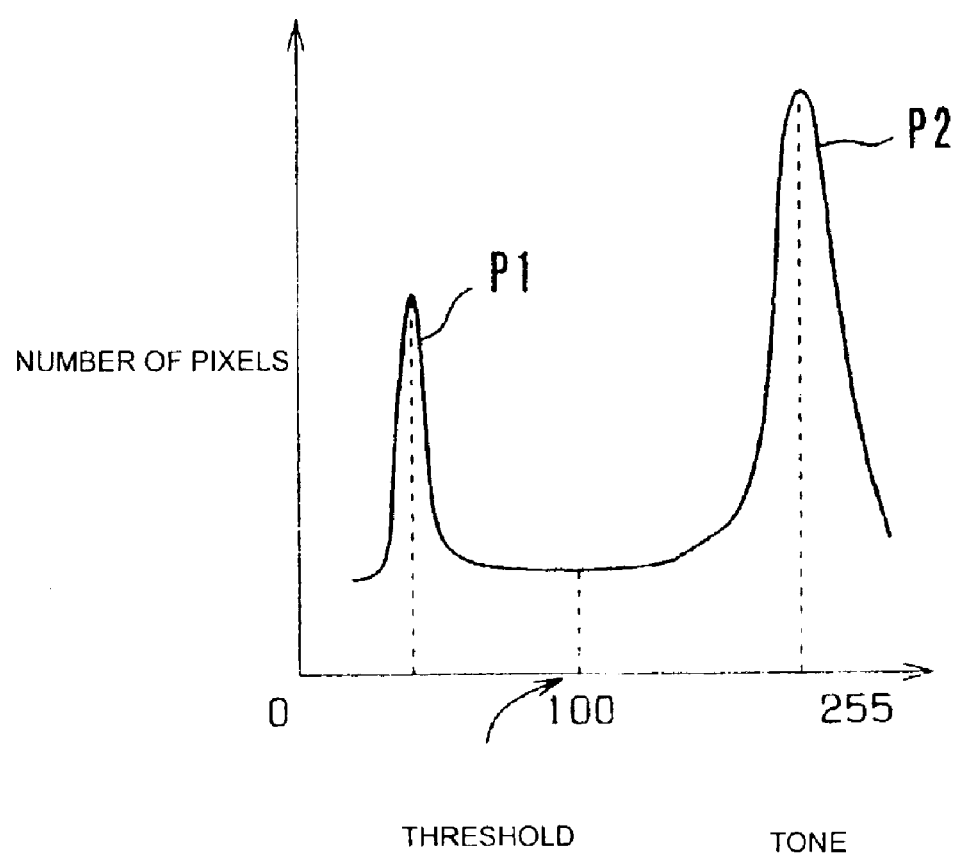
FIG. 5 shows a brightness histogram of a grey level.

The internal electrode 47 of the calibration reference electrode sheet is imaged again with the CCD camera 31 while the illumination is set as described above. Thus, the picked-up image is gradation-grey processed with the processor 51 as shown in FIG. 4 (gradation 0: black, gradation 255: white). The brightness histogram of the grey level is calculated and displayed on the monitor 27. As shown in FIG. 5, the brightness histogram (reference brightness histogram) has two large peaks P1 and P2, caused by the two different colors of the ceramic green sheet 46 and the internal electrode 47, respectively. That is, the color of the ceramic green sheet 46 is nearly white, and the peak P2 on the large brightness side is positioned at a gradation of 240 to 250. The color of the internal electrode 47 is nearly black, and the peak P1 on the small brightness side is positioned at a gradation of 60 to 70.

The reproducibility of the positions of the peaks P1 and P2 is high, and the brightness calibration is carried out, using the positions of the peaks P1 and P2. In particular, the calibration reference electrode sheet is imaged again before the next image processing step is carried out. It is confirmed whether the brightness histogram of the picked-up image (the positions of the two peaks P1' and P2') is coincident with the positions of the two peaks P1 and P2 of the reference brightness histogram stored in the processor 51. If the positions are shifted, the illuminance of the luminaire 29 is adjusted so that the positions of the two peaks P1' and P2' are coincident with those of the two peaks P1 and P2 of the reference brightness histogram.

For determination of the area of the internal electrode 47 (a binarized threshold is used), a gradation between the peaks P1 and P2 is used as a threshold. As the threshold, a gradation expressed by {(the gradation of the peak P1)+(the gradation of the peak P2)}×(a factor of 0.4 to 0.6) is preferred. For example, when the threshold is set at a gradation of 100, a picked-up image 256 gradation-grey processed and is divided into black and white sections based on the threshold as a boundary. That is, the section having a gradation of 0 to 100 (the section corresponding to the internal electrode 47) is determined as a black section, while the section having a gradation of 101 to 255 (the section corresponding to the ceramic green sheet 46) is determined as a white section. If the internal electrode 47 has fine printing faults such as printing blurs and scratches, the gradation of a pixel (e.g., the pixel shown by slanting lines in FIG. 4) of the CCD camera 31 will exceeds a threshold of 100, the pixel corresponding to the position of the internal electrode 47 where the fine printing fault is present. Thus, the pixel is determined as a white one.

Subsequently, the count of the black pixels is multiplied by the area per pixel (preferably, up to 10 $\mu m^2$, e.g., 1 $\mu m^2$) of the object, which is calibrated in advance. Thus, the area of the internal electrode 47 is accurately calculated. As seen in the above-description, the brightness-calibration can be performed simply by using the positions of the two peaks P1 and P2 in the brightness histogram, and not requiring a complicated operation. When this system is adopted, the measurement can be performed considering fine printing faults. Thus, the small areas of internal electrodes of laminated capacitors or the like can be accurately measured.

Figure 6A:
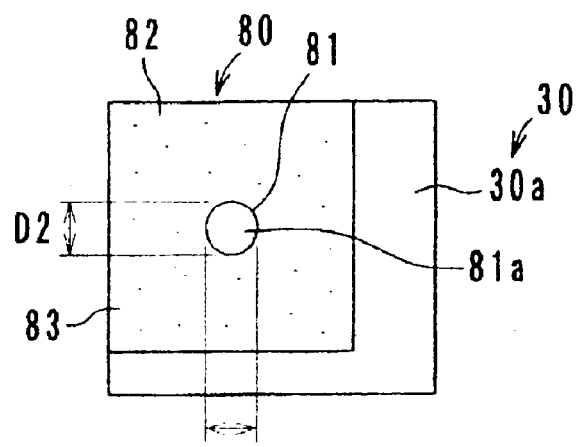
FIG. 6A is a plan view of a size-calibration device.
Figure 6B:
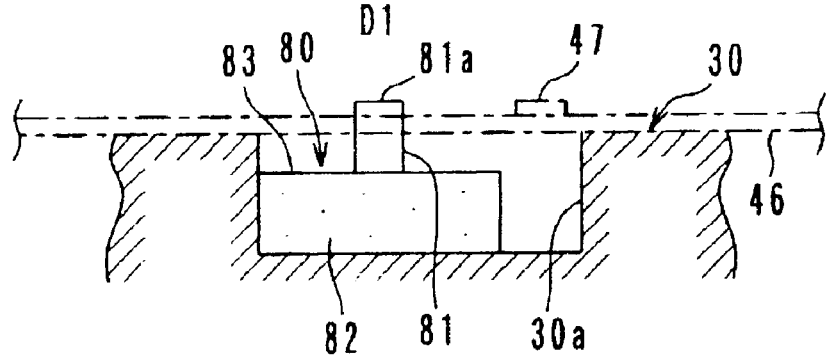
FIG. 6B is a front view of the device.

The size of an object per pixel in the longitudinal and transverse directions of the CCD camera 31 can be determined by use of the size calibration process which will be described below. A size reference object of which the size is known is imaged and measured. The size per pixel is calculated based on the number of corresponding pixels. As shown in FIGS. 6A and 6B, a calibration device 80 comprises a base stand 82, and a columnar member 81 (e.g., a metallic pin gauge) disposed at the center of the base stand 82. For calibration work, the calibration device 80 is placed into a concavity 30a formed in the upper surface of a measuring table 30. Preferably, the columnar member 81 is made of a type of material that suffers less time-dependent changes or environmental changes (e.g., metals and resins). Preferably, the cross section of the columnar member 81 has such a size as to be contained in the visual field of the CCD camera 31, and has a true circular shape. A metallic pin gauge is suitable as the columnar member 81. The top head surface 81a of the columnar member 81 is polished to be flat. The height of the columnar member 81 is set so that the position of the top head surface substantially coincides with that of the internal electrode 47 when the internal electrode 47 is imaged. For practical use, the surface of the green sheet 46 may be taken to coincide with that of the internal electrode 47, since the thickness of the internal electrode 47 is small, that is, several $\mu$m. The columnar member 81 functions as a reference for the size-calibration in the longitudinal and transverse directions of one pixel of the CCD camera 31.

The upper surface 83 of the base stand 82 has a larger area than the visual field of the CCD camera 31. For example, the area of the upper surface 83 is set at a value of 5 mm×5 mm or larger based on a visual field area of 1 mm×1 mm. The upper surface 83 is black-color matting-treated e.g., by the Leydent processing, or surface-treated by painting, coating, black-color dying, or the like, so that the illumination-reflection is suppressed. Thereby, when the top head surface 81a of the columnar member 81 is imaged, the color of the background of the picked-up image is substantially black, so that the profile of the top head surface 81a becomes definite. Accordingly, pixels can be accurately counted (image processing), and high-precision size calibration can be performed.

In the calibration device 80 constituted as described above, the diameter D2 in the longitudinal direction (Y direction) and the diameter D1 in the transverse direction (X-direction) of the top head surface 81a of the columnar member 81 are accurately measured. In this case, the directions X and Y correspond to those of the pixel arrangement of the CCD camera 31. For the measurement, a length-meter such as a tool microscope, a micrometer, a Vernier caliper, or the like is employed.

Figure 7:
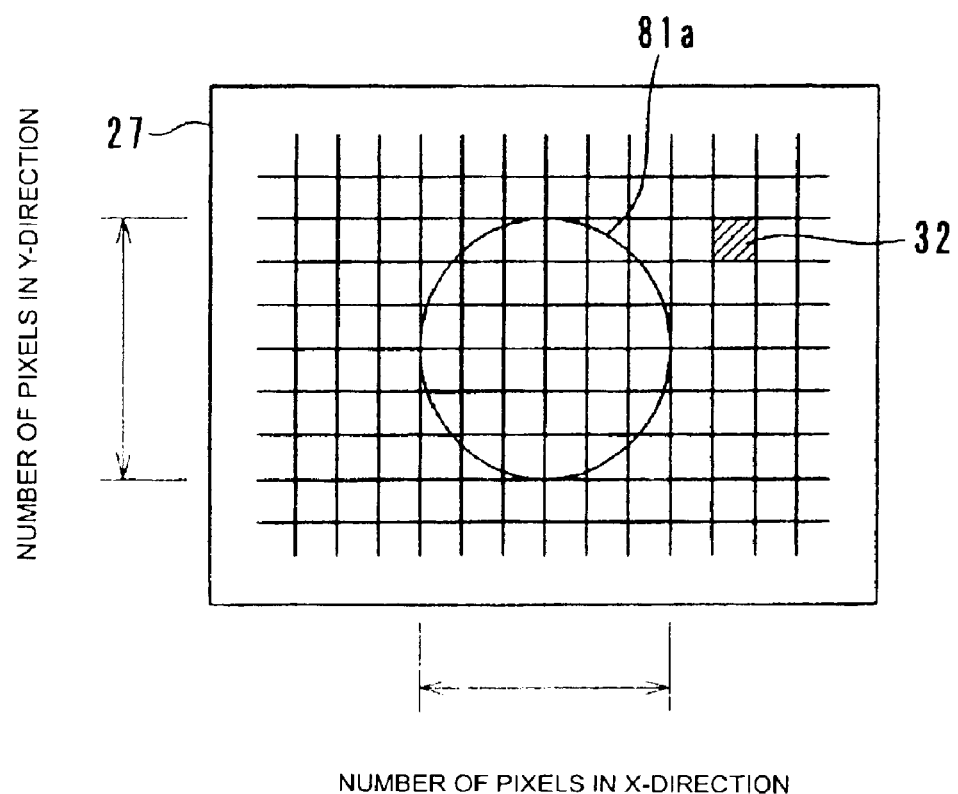
FIG. 7 illustrates a size-calibration method using the device.

Subsequently, the calibration device 80 is set in the concavity 30a of the measuring table 30, and then, the top head surface 81a is imaged with the CCD camera 31. In this case, the illuminance of the luminaire 29 is adjusted according to the above-described adjustment method using a reference brightness histogram. The obtained image of the top head surface 81a is displayed on the monitor 27 as shown in FIG. 7, and also, is processed with the processor 51. Pixels arranged over the diameter D2 in the longitudinal direction (Y-direction) of the top head surface 81a and over the diameter D1 in the transverse direction (X-direction) thereof are counted, respectively. In this case, the longitudinal and transverse directions of the diameters correspond to those of the arrangement of pixels, respectively. Then, the size per pixel in the longitudinal and transverse directions of the object is calculated according to the following equations (3) and (4).

(the longitudinal size per pixel of an object)=(the longitudinal diameter D1 of a top head surface 81a measured with a lengthmeter in advance)/(the number of pixels present in the longitudinal direction)   (3)

(the transverse size per pixel of an object)=(the transverse diameter D2 of the top head surface 81a measured with a lengthmeter in advance)/(the number of pixels present in the transverse direction)   (4)

Since the shape of each pixel of the CCD camera 31 is square, the resolution in the longitudinal direction (Y-direction) and that in the transverse direction (X-direction) are equal to each other. Thus, the size calibration can be easily performed. Moreover, advantageously, the CCD camera 31 can be easily focused, since the columnar member 81 of the calibration device 80 has a three-dimensional structure. In addition, the metallic pin gauge 81 used as the columnar member has a high true circularity. Accordingly, even if the arrangement axis of pixels is shifted, high precision size calibration can be performed.

The calibration device is not restricted to the structure shown in FIGS. 6A and 6B in which the columnar member 81 is disposed upright on the base stand 82. The columnar member 81 may be directly embedded into the measuring table 30. In this case, the upper surface of the measuring table 30 in the periphery of the top head surface 81a of the columnar member 81 is depressed. Thus, the top head surface 81a and the upper surface of the measuring table 30 are given a perspective, which facilitates the calibration work. Moreover, the calibration device 80 may be exchanged with the measuring table 30.

Figure 8A:
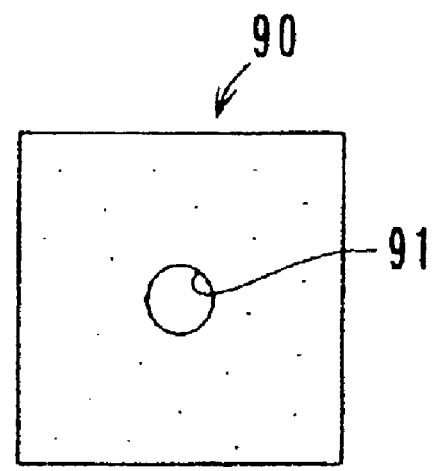
FIG. 8A is a plan view of a modification of the size-calibration device.
Figure 8B:
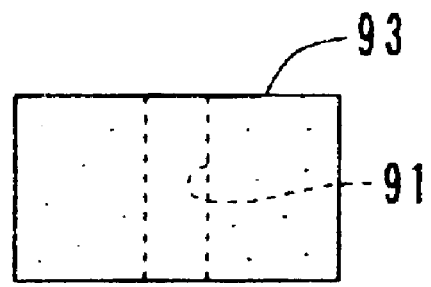
FIG. 8B is a front view of the modification.

Furthermore, as shown in FIGS. 8A and 8B, a rectangular calibration device 91 having a substantially true circular hole 91 formed in the center thereof may be employed. The hole 91 can be formed by drilling, laser, water jet or discharge working, or the like. This hole 91 functions as a reference for the size calibration in the longitudinal and transverse directions of one pixel of the CCD camera 31. The hole 91 may be a perforation, in which parallel light may be irradiated from the side opposite to the CCD camera 31 for calibration. The number of components of the calibration device 90 is small, and is influenced very little by the construction accuracy of the device. Accordingly, the calibration device 90 can be inexpensively manufactured.

The present invention is not restricted to the above-described embodiments, and various modifications are possible without departing from the spirit of the invention. For example, according to the embodiment of FIG. 2, the area of the internal electrode is measured before the internal electrode screen-printed is dried. Instead, the area of the internal electrode may be measured after the electrode is passed through the drying unit 9 to be dried. Moreover, according to the above-mentioned embodiment, the area of the internal electrode is measured after measurement of the sheet thickness. The sequence of the processes may be reversed. Furthermore, the internal electrode may be formed by gravure printing, sputtering, photolithography, plating, or the like, in addition to screen-printing.

Moreover, in the above-described embodiments, one internal electrode 47 is taken in the visual field of the CCD camera 31 to be imaged, and the image is processed. This is not restrictive. For example, an internal electrode 47 may be divided into plural regions. The respective regions are imaged with the same CCD camera or plural CCD cameras of which the magnifications are adjusted to be equal. The area of each region is calculated as in the above-described embodiment. The sum of the areas of the respective regions is taken as the area of the internal electrode. Thereby, the resolution per pixel of the CCD camera can be indirectly enhanced. Thus, measurement of an area at a higher magnification can be enabled.

Moreover, plural internal electrodes may be taken in the visual field of the CCD camera 31 and imaged, and are gradation-grey processed with the processor 51. Subsequently, binarization is carried out using a predetermined threshold. A block of pixels having a gradation value lower than a threshold is determined and is filtered based on predetermined upper and lower limits, so that blocks of the plural internal electrodes are determined. Then, the areas of the respective internal electrodes are determined as in the above-described embodiment. Alternatively, the total area of the respective internal electrodes is determined after the filtering, and is divided by the number of the internal electrodes taken in the visual field, whereby the area per internal electrode is determined. Thus, the areas of the plural internal electrodes can be determined by use of one imaging process. Therefore, the area measurement time can be reduced. Also, the areas of the plural internal electrodes can be simultaneously determined by means of one CCD camera. Accordingly, no dispersions are caused in devices such as cameras, lenses, and luminaires.

Although the present invention has been described in relation to particular embodiments thereof, many other variations and modifications and other uses will become apparent to those skilled in the art. Therefore, the present invention is not limited by the specific disclosure herein.

What is claimed is:

1. A method of producing a laminated electronic part comprising the steps of:

forming an internal electrode on the surface of a ceramic green sheet in a continuous production line;

measuring the thickness of the at least one ceramic green sheet and generating thickness data;

imaging said internal electrode disposed on the surface of the at least one ceramic green sheet and generating image data;

calculating a number of sheets to be laminated, based on area data which is prepared in response to said thickness data and said image data;

drying said internal electrode after said step of imaging said internal electrode; and laminating a plurality of ceramic green sheets corresponding to the calculated number of sheets to be laminated;

the respective processes being carried out in a continuous production line; and wherein the ceramic green sheets are laminated so that an overlap degree between internal electrodes opposed in the lamination direction is constant for all the sheets.

2. A method of producing a laminated electronic part according to claim 1, wherein said drying step precedes said laminating step.

3. A method of producing a laminated electronic part according to claim 1, further comprising the steps of calculating said overlap degree, and carrying out said laminating step so that said overlap degree is constant for all the sheets.

4. An apparatus for producing a laminated electronic part comprising:
   an internal electrode forming unit for forming an internal electrode on the surface of at least one ceramic green sheet provided in a continuous production line;
   a sheet-thickness measuring unit for measuring the thickness of the at least one ceramic green sheet;
   an internal electrode image-pick up unit for imaging internal electrode disposed on the surface of the at least one ceramic green sheet;
   a processing unit for calculating a number of sheets to be laminated, based on area data which is prepared in response to thickness data generated by the sheet-thickness measuring unit and picked-up image data generated by the internal electrode image-pick up unit;
   a drying unit for drying said internal electrode; and
   a laminating unit for laminating a plurality of ceramic green sheets;
   the respective units being arranged in a continuous production line with the drying unit being arranged at a stage in the continuous production line after the internal electrode image pickup unit; and
   wherein the laminating unit is adapted to laminate the ceramic green sheets so that an overlap degree between internal electrodes opposed in the lamination direction is constant for all the sheets.

5. An apparatus for producing a laminated electronic part according to claim 4, wherein the sheet-thickness measuring unit measures the thickness of each of said plurality of ceramic green sheets, and the laminating unit laminates each of said ceramic green sheets.

6. An apparatus for producing a laminated electronic part according to claim 5, further comprising an internal electrode forming unit for forming an internal electrode on the surface of at least one of said ceramic green sheets provided in the continuous production line at a stage prior to the internal electrode image-pick up unit.

7. An apparatus for producing a laminated electronic part according to claim 5, wherein the internal electrode image-pick up unit is adapted to directly image the internal electrode, and contains a CCD camera of which the pixels have a square shape, and are arranged in a square grating pattern.

8. An apparatus for producing a laminated electronic part according to claim 7, further comprising a substantially columnar size-calibrating member, for calibrating the sizes in the longitudinal and transverse directions per pixel of the CCD camera.

9. An apparatus for producing a laminated electronic part according to claim 4, wherein the sheet-thickness measuring unit is adapted to measure the thickness of a card-shaped printed ceramic green sheet, and the internal electrode image-pick up unit is adapted to image an internal electrode formed on the card-shaped printed ceramic green sheet, and the laminating unit is adapted to laminate a plurality of card-shaped printed ceramic green sheets so that an overlap degree between internal electrodes opposed in the lamination direction is constant for all the layers.

10. An apparatus for producing a laminated electronic part according to claim 4, wherein the internal electrode image-pick up unit is adapted to directly image the internal electrode, and contains a CCD camera of which the pixels have a square shape, and are arranged in a square grating pattern.

11. An apparatus for producing a laminated electronic part according to claim 10, further comprising a substantially columnar size-calibrating member, for calibrating the sizes in the longitudinal and transverse directions per pixel of the CCD camera.

12. An apparatus for producing a laminated electronic part according to claim 4, wherein said drying unit is arranged before said laminating unit in said continuous production line.

13. An apparatus for producing a laminated electronic part according to claim 4, wherein said processing unit calculates said overlap degree end controls the laminating unit so that said overlap degree is constant for all the sheets.

* * * * *